J. JIMAS.
BOTTLE CONVEYING MACHINE.
APPLICATION FILED JULY 16, 1919.
1,399,260.
Patented Dec. 6, 1921.
14 SHEETS—SHEET 1.
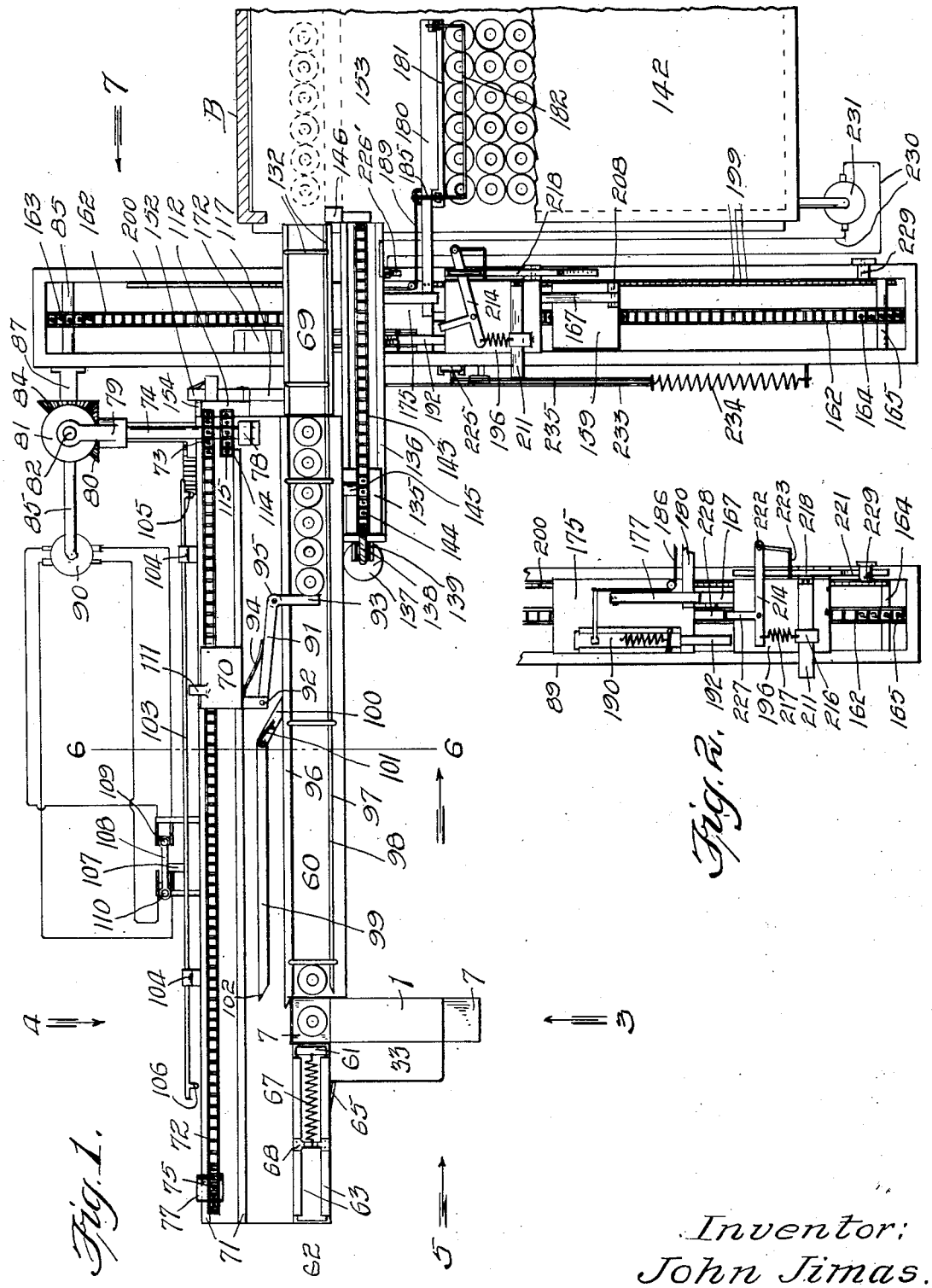
Inventor:
John Jimas.
By Fredk. J. Sharon
Attorney.

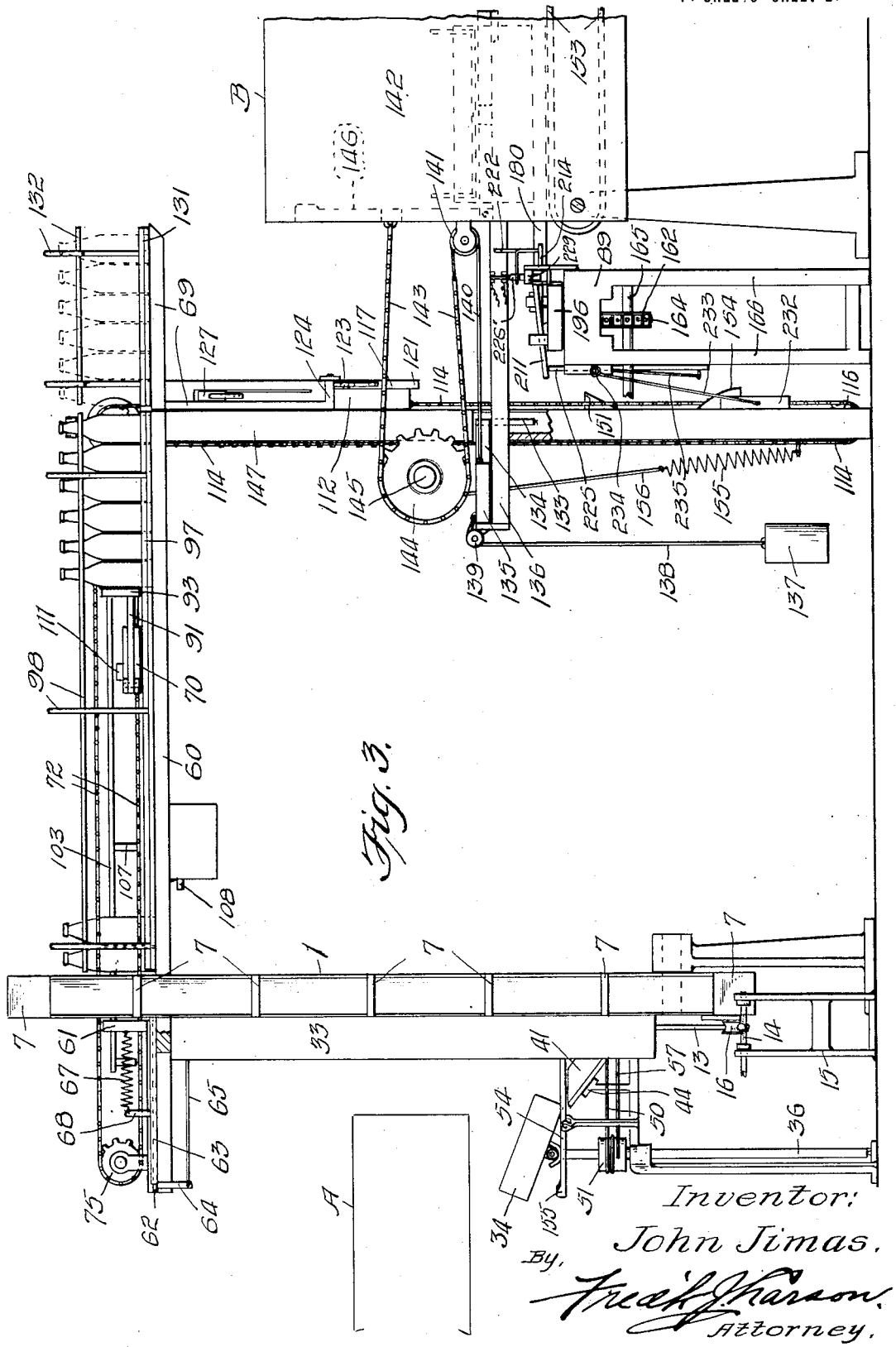

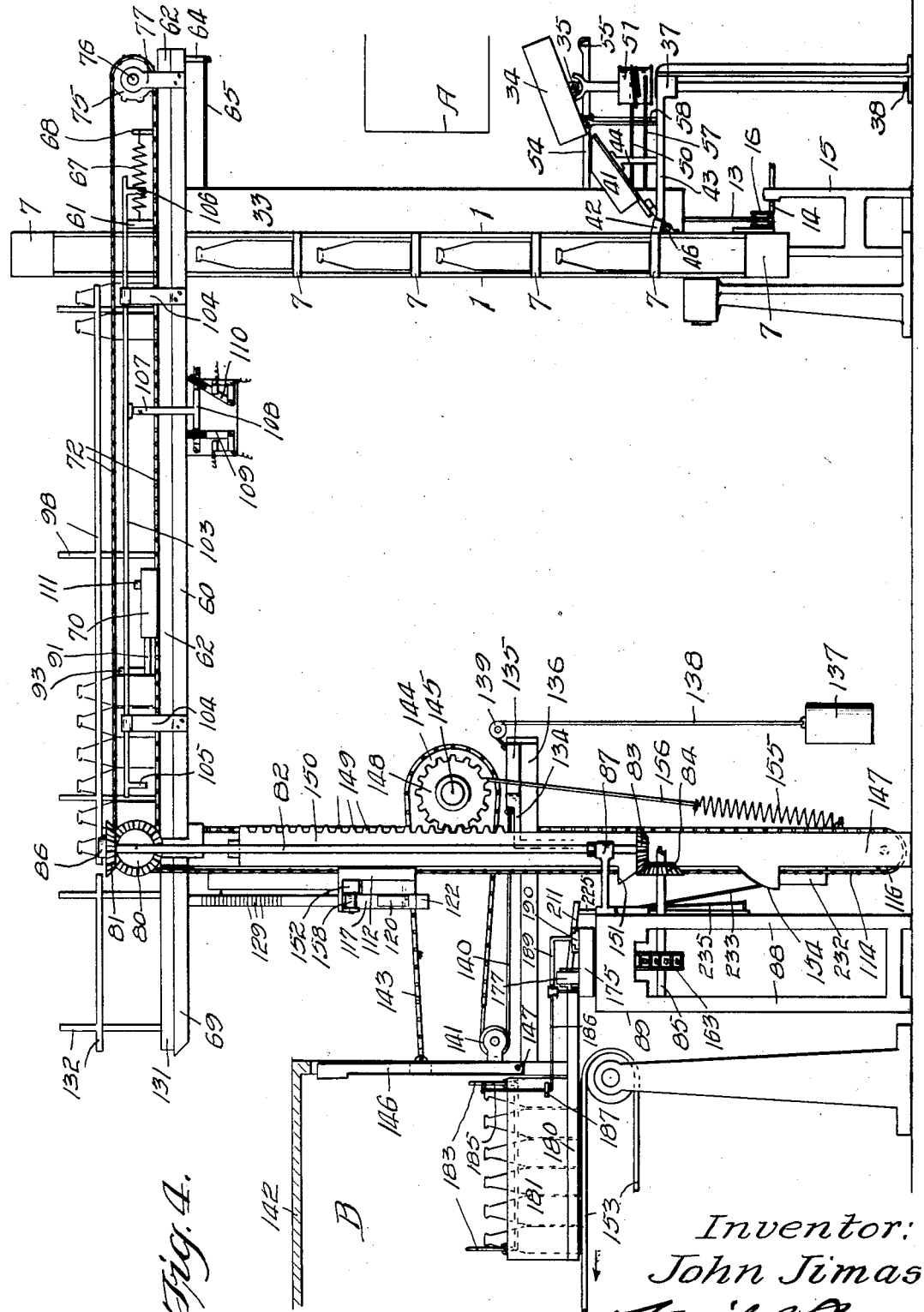

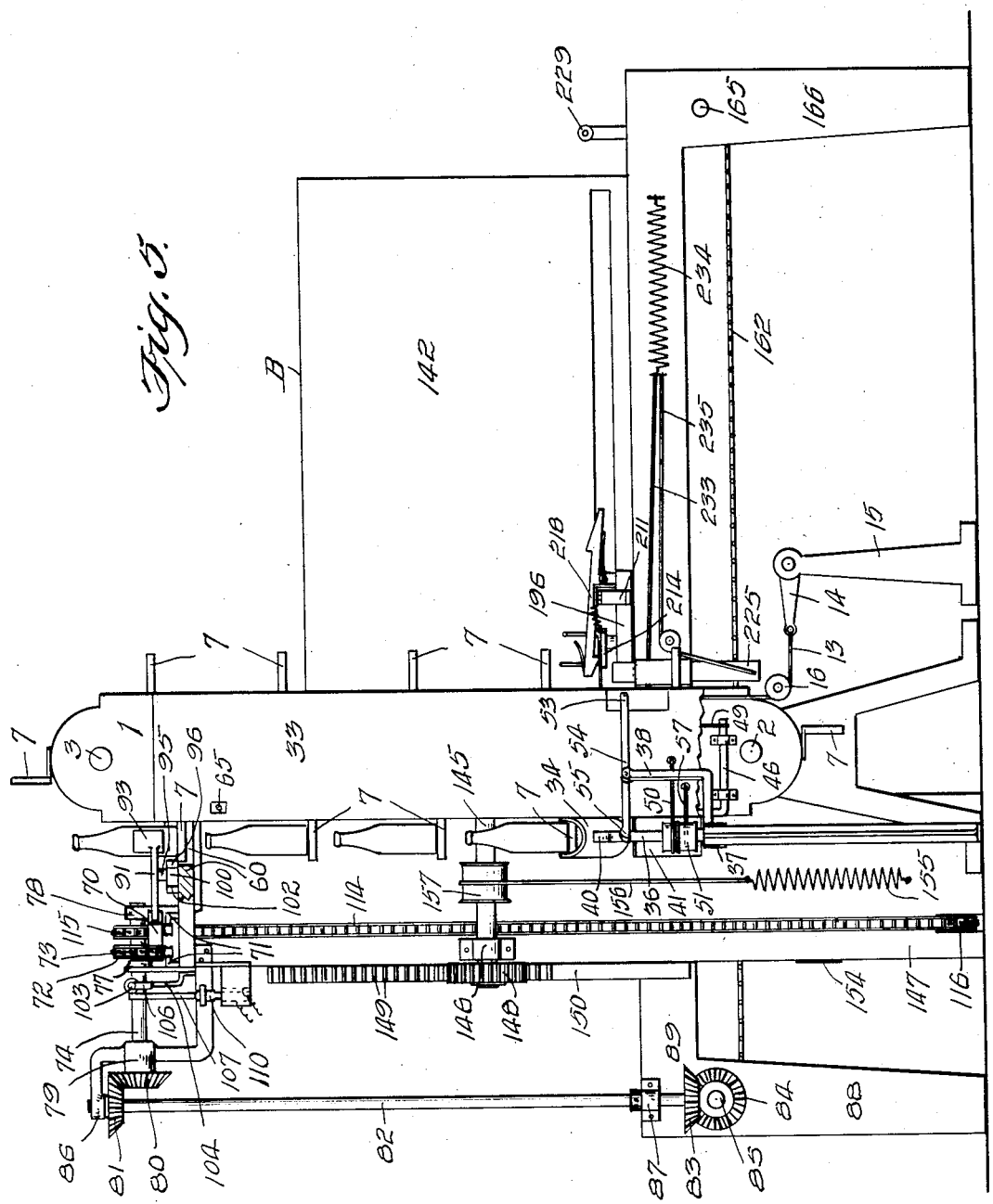

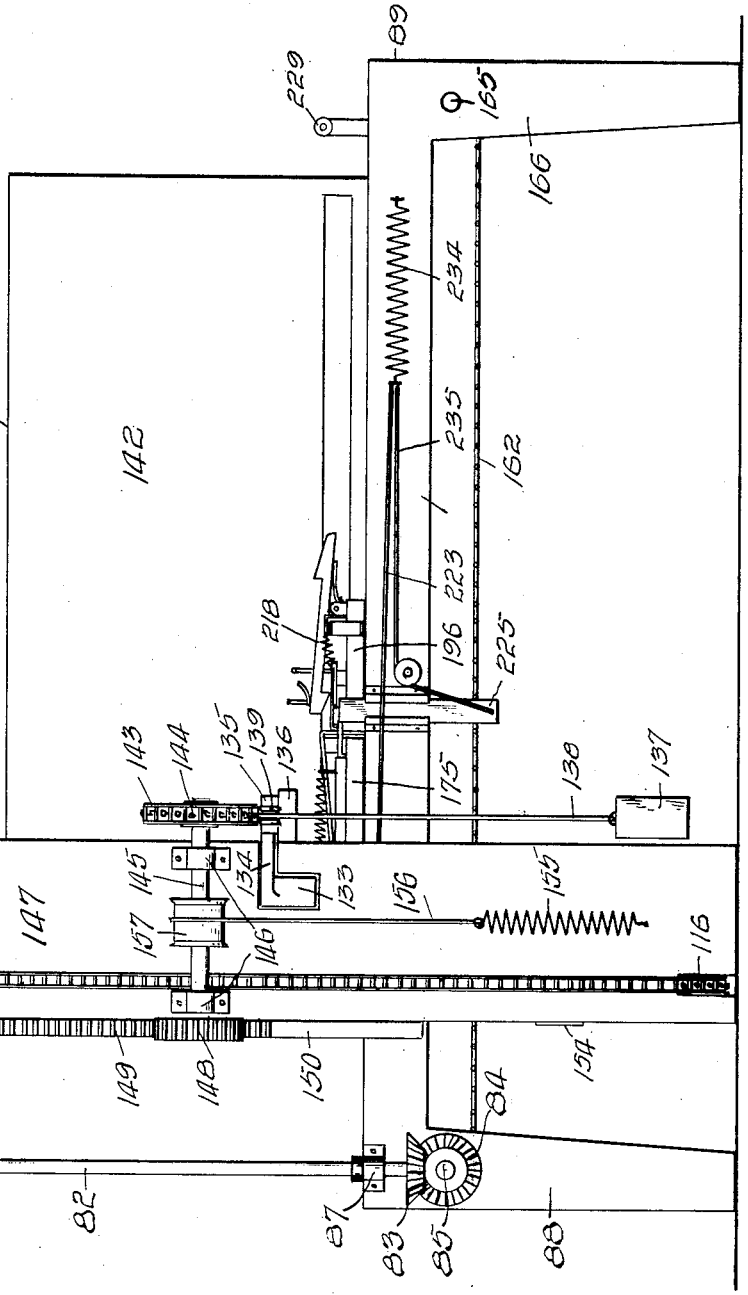

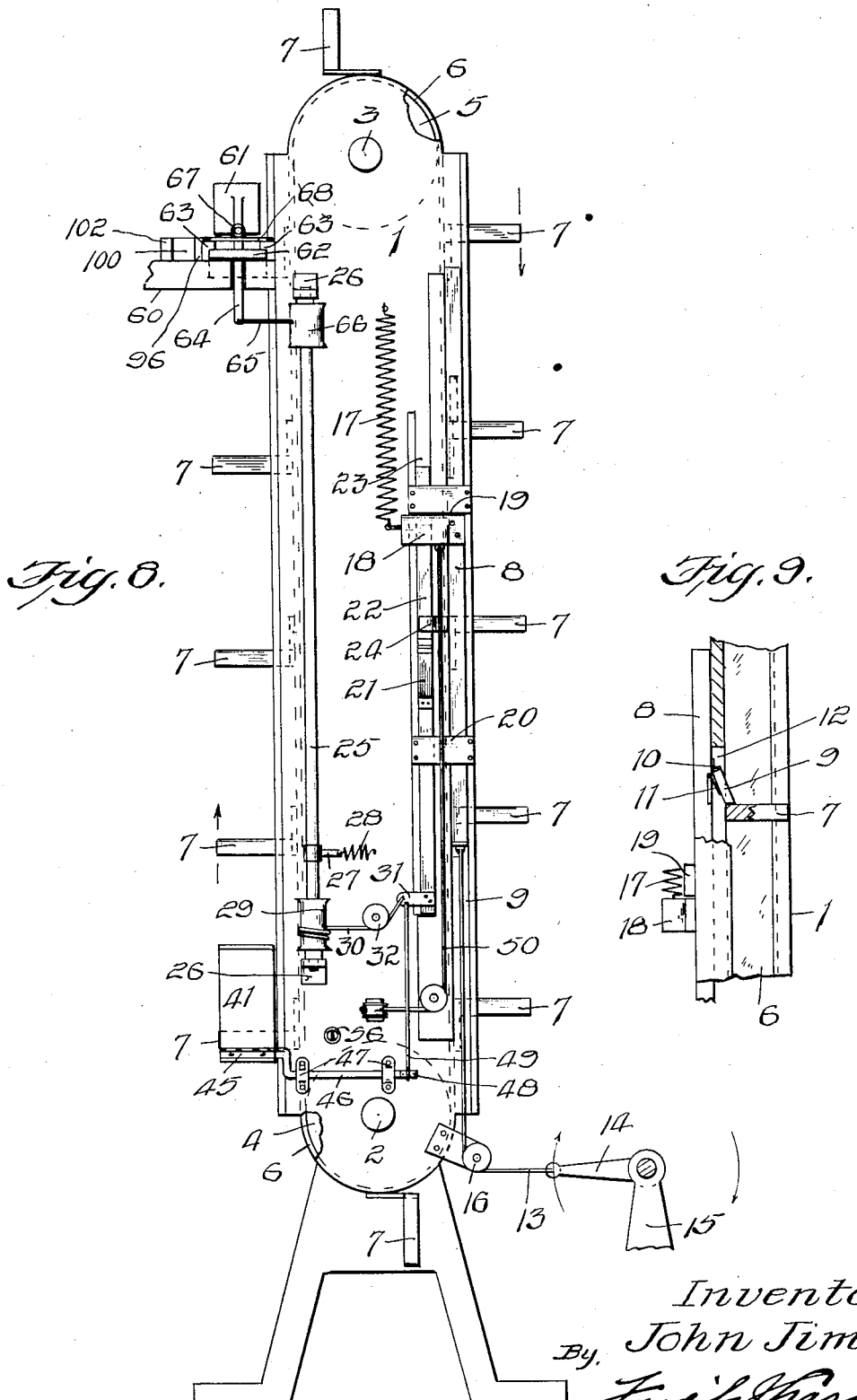

J. JIMAS.
BOTTLE CONVEYING MACHINE.
APPLICATION FILED JULY 16, 1919.
1,399,260.
Patented Dec. 6, 1921.
14 SHEETS—SHEET 8.
Fig. 10.
Fig. 11.
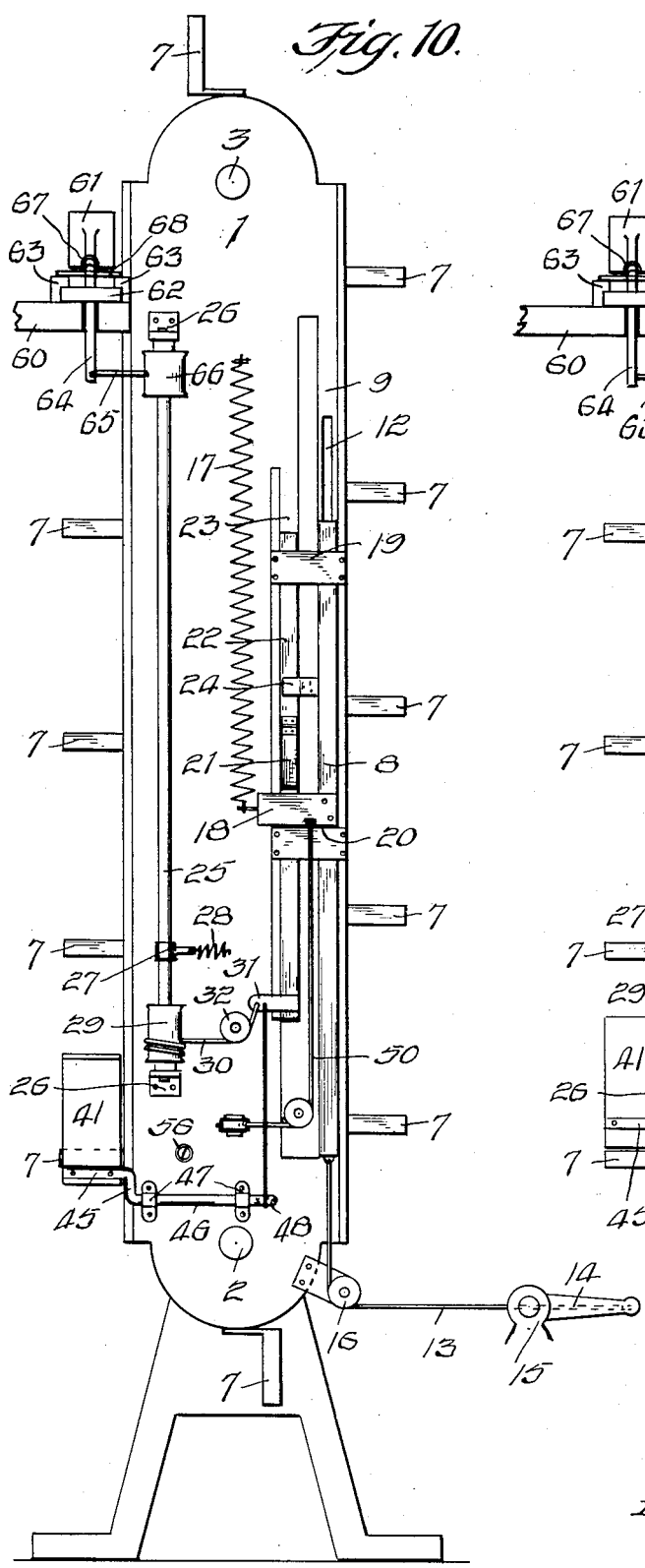
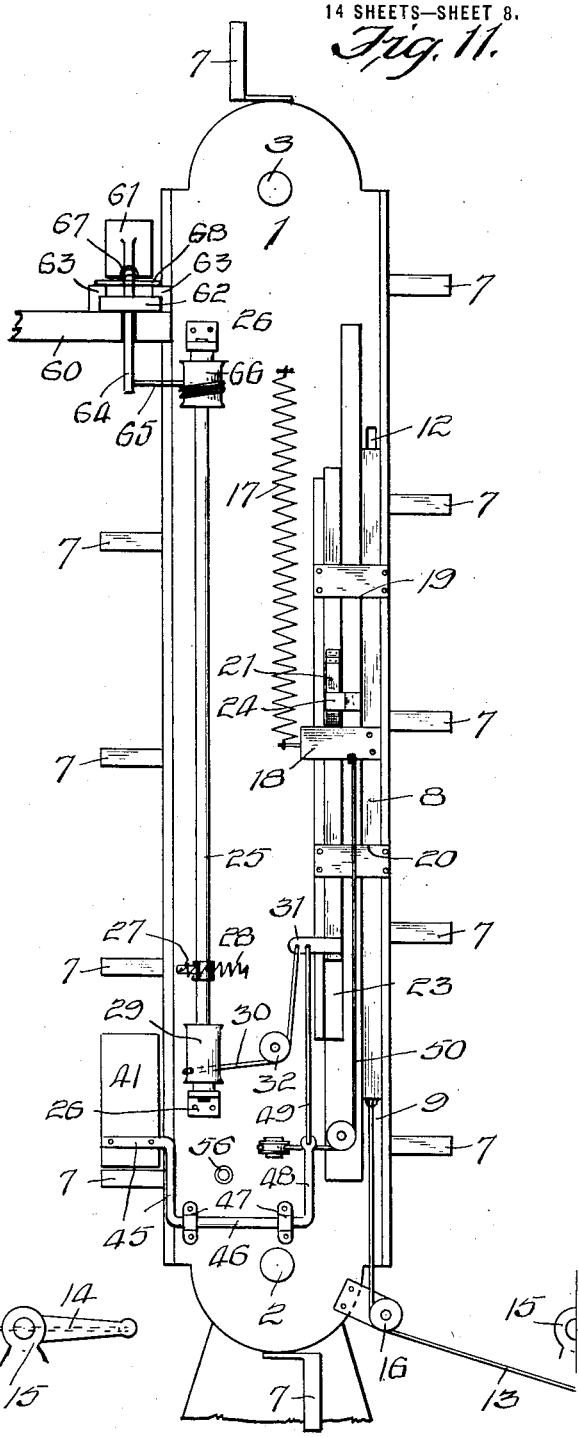
Inventor:
John Jimas.
By Fred'k J. Larson
Attorney.

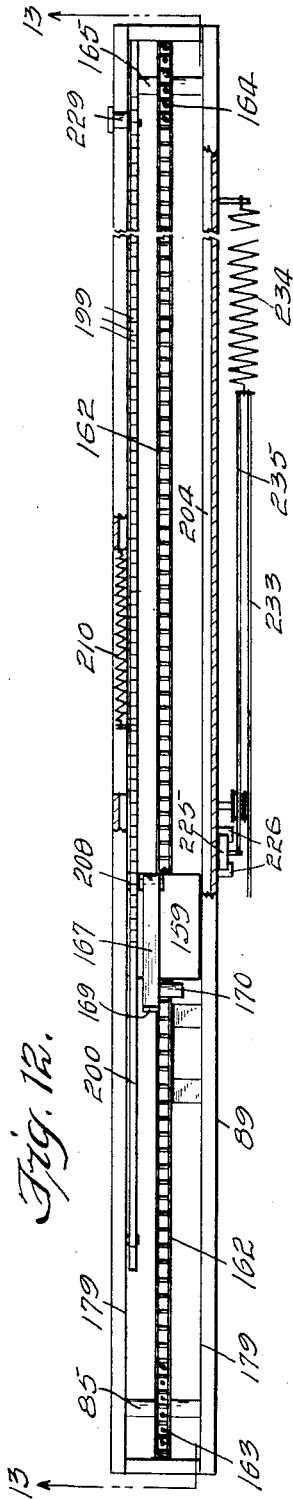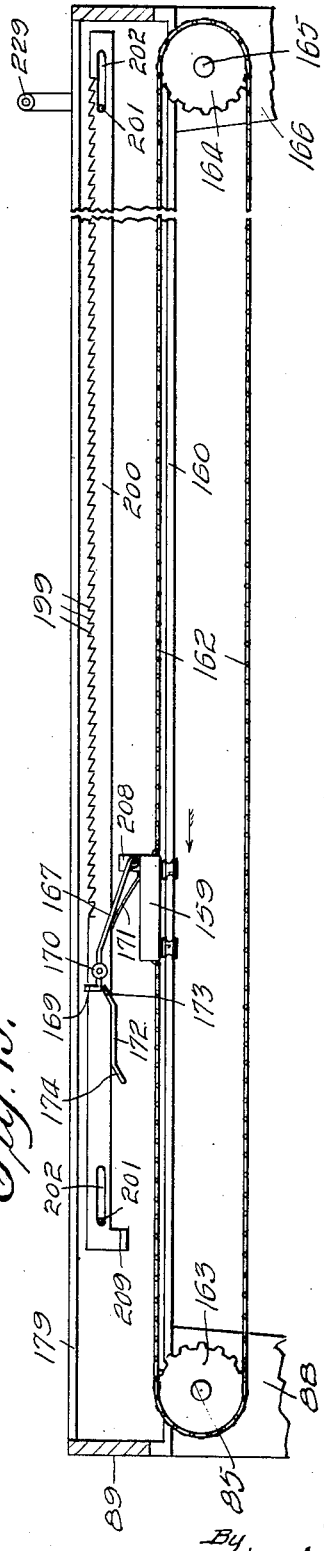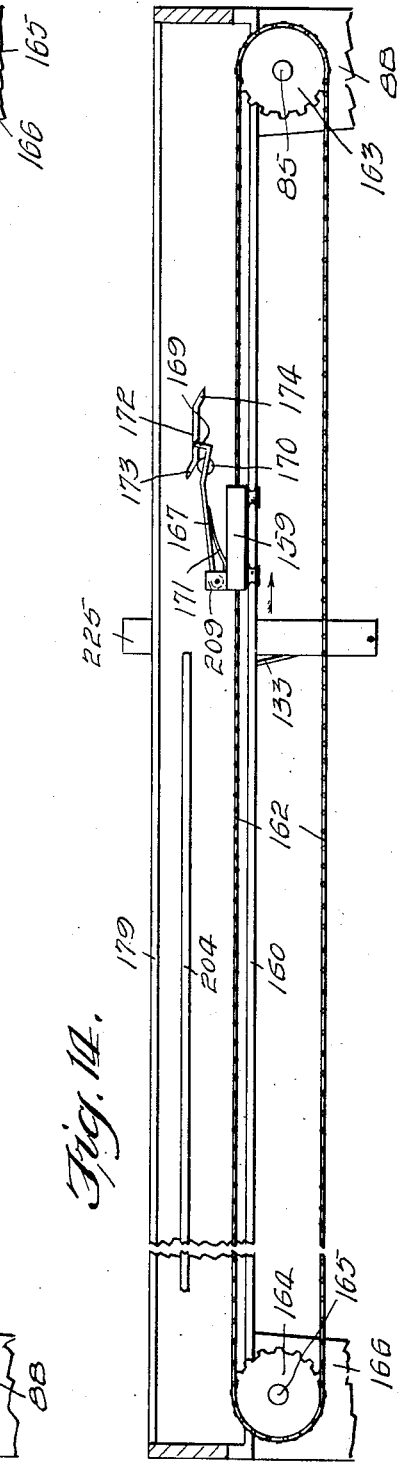

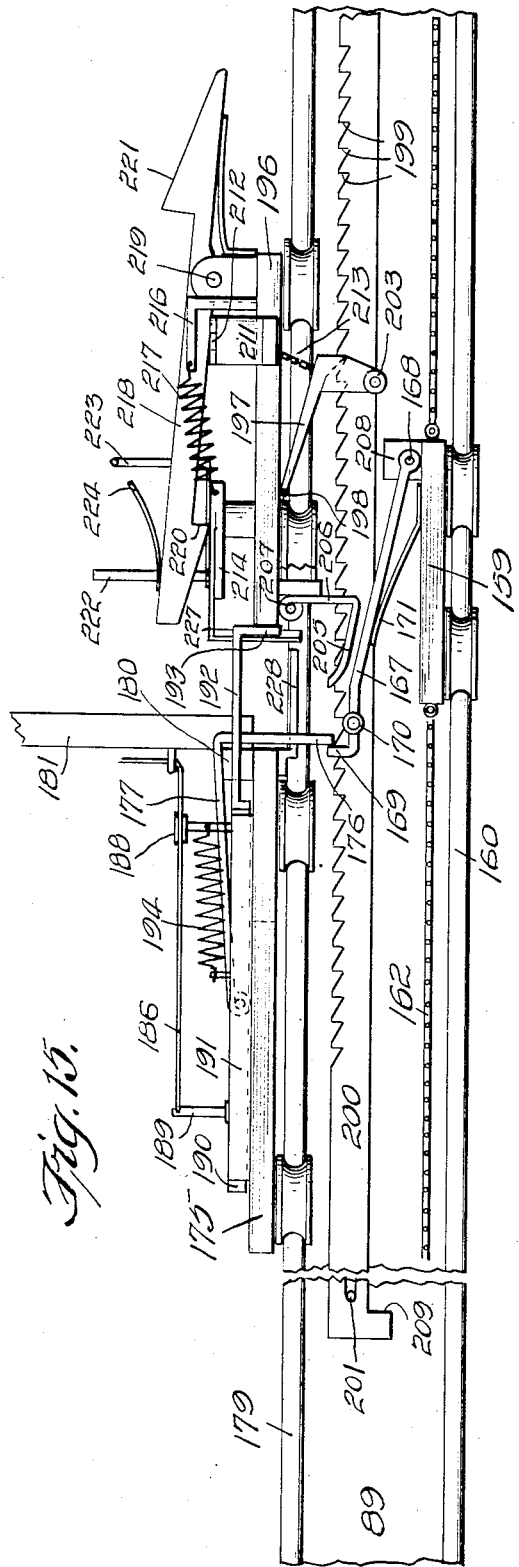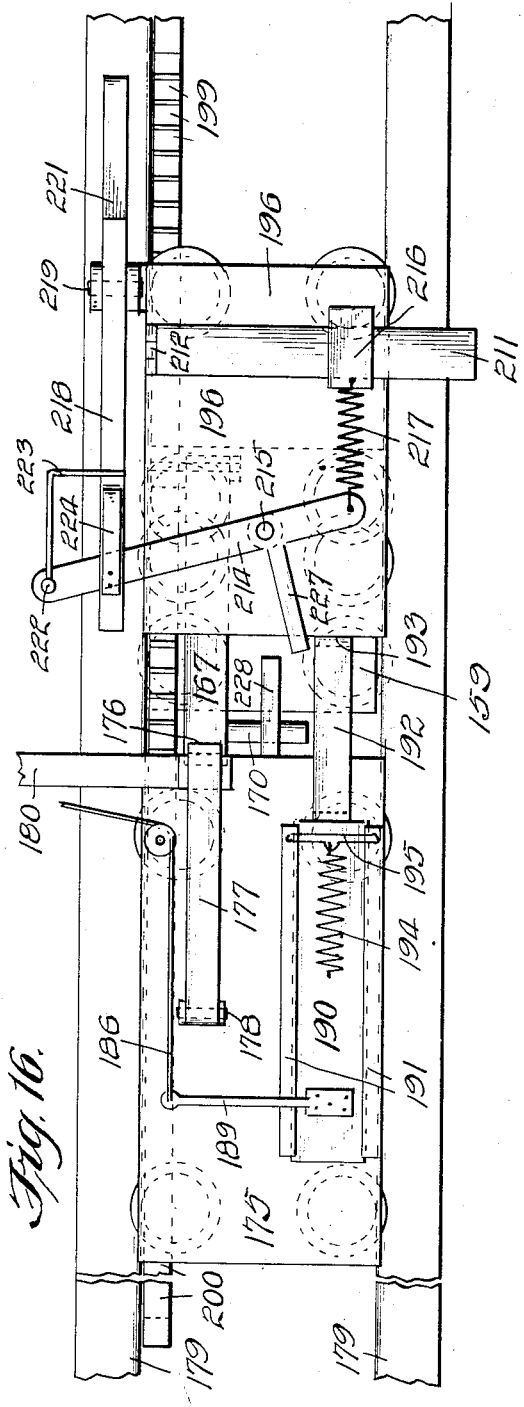

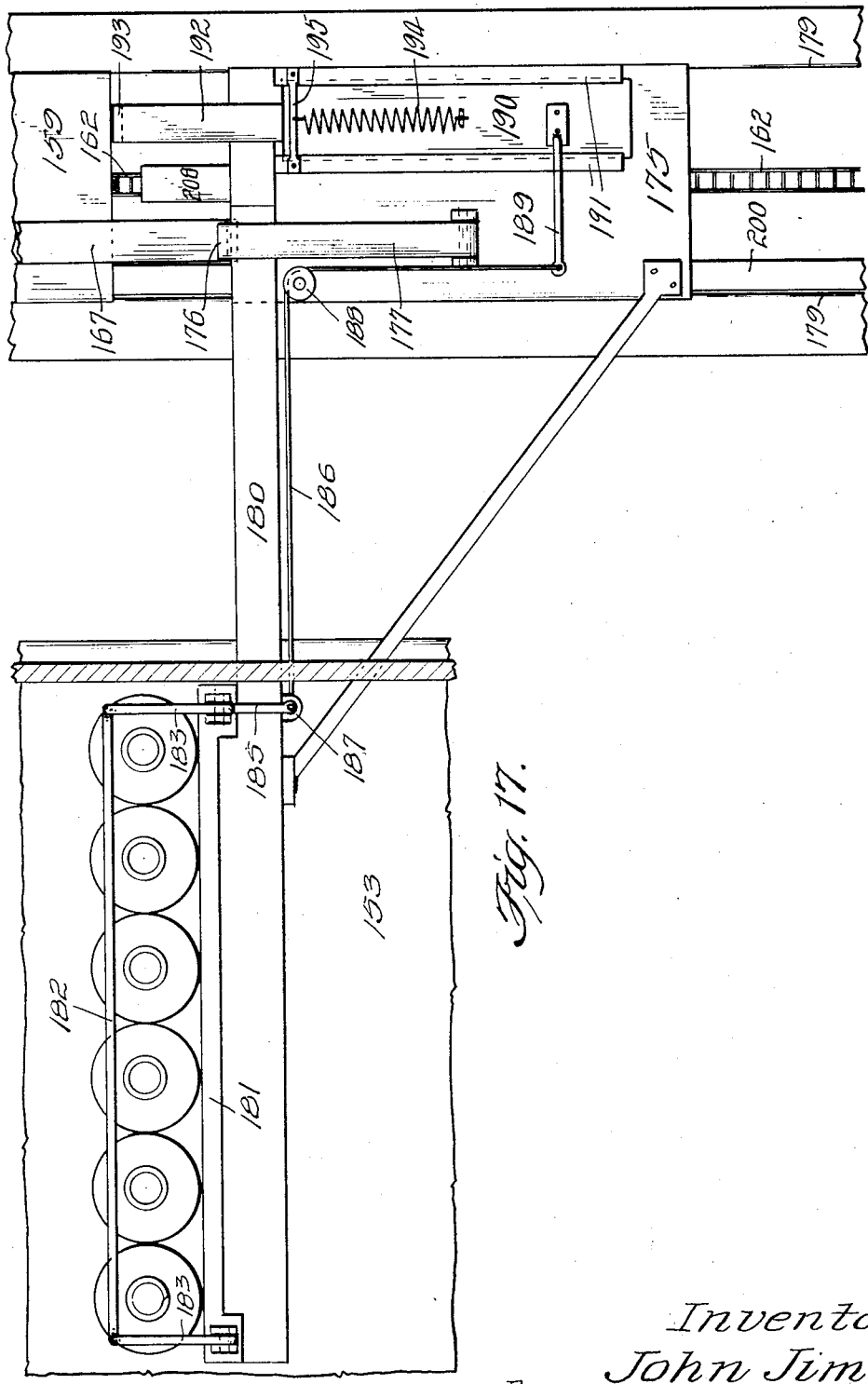

J. JIMAS.
BOTTLE CONVEYING MACHINE.
APPLICATION FILED JULY 16, 1919.

1,399,260.

Patented Dec. 6, 1921.
14 SHEETS—SHEET 12.

Inventor:
John Jimas.

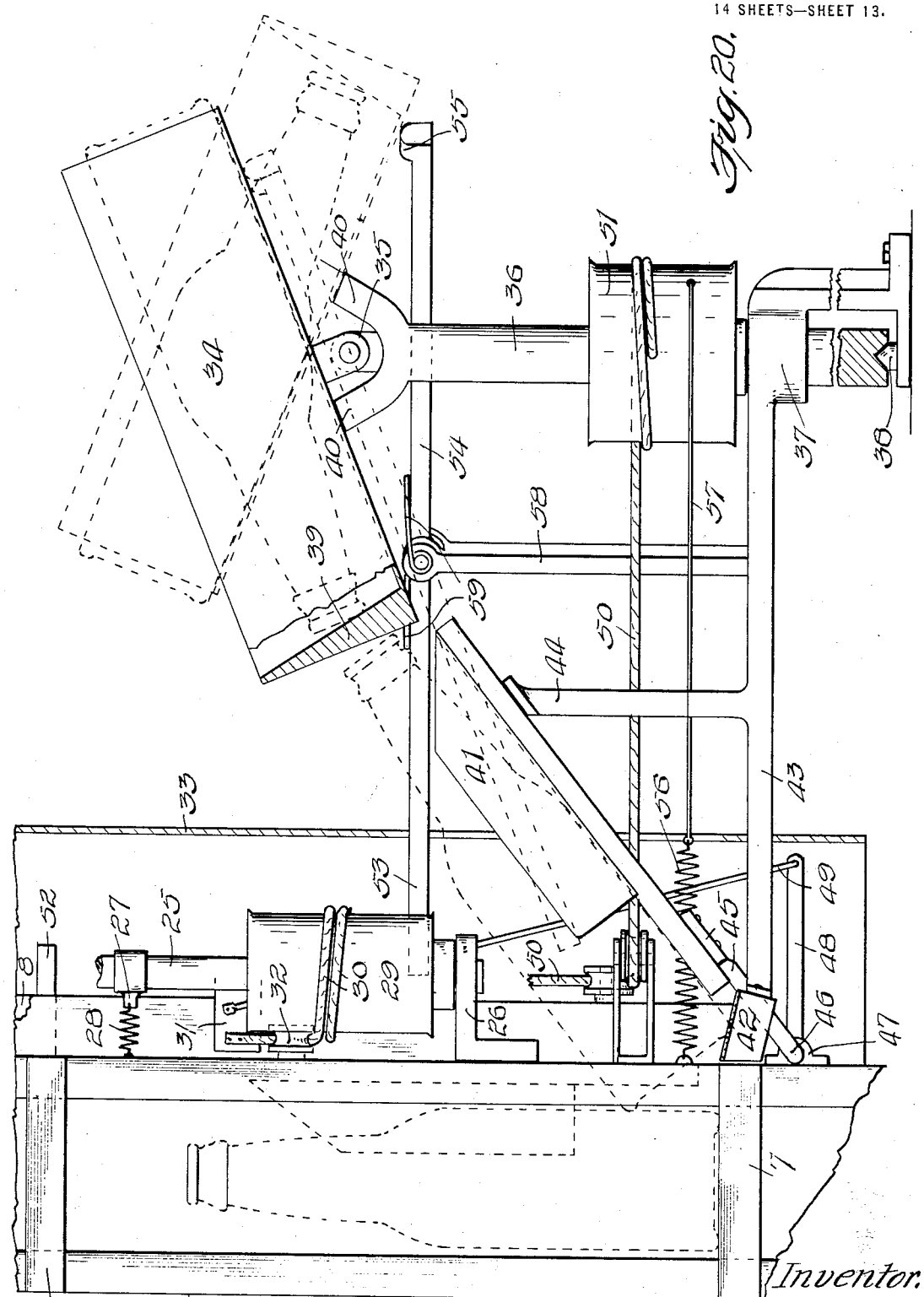

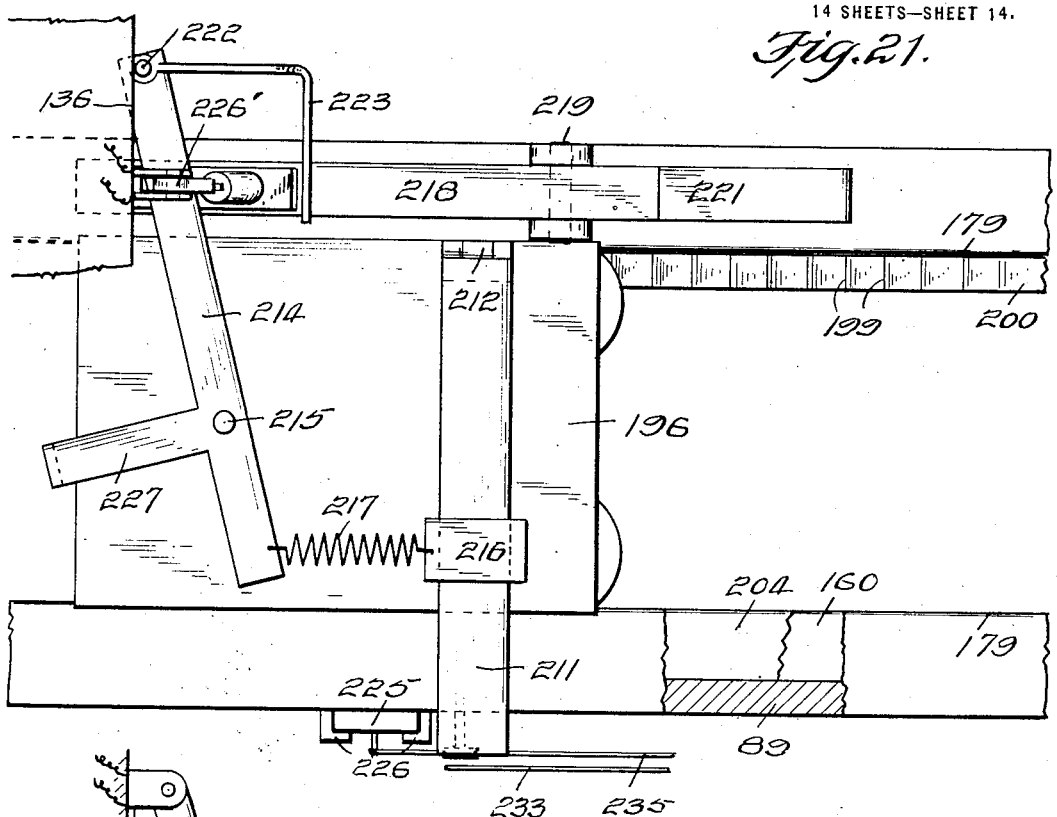
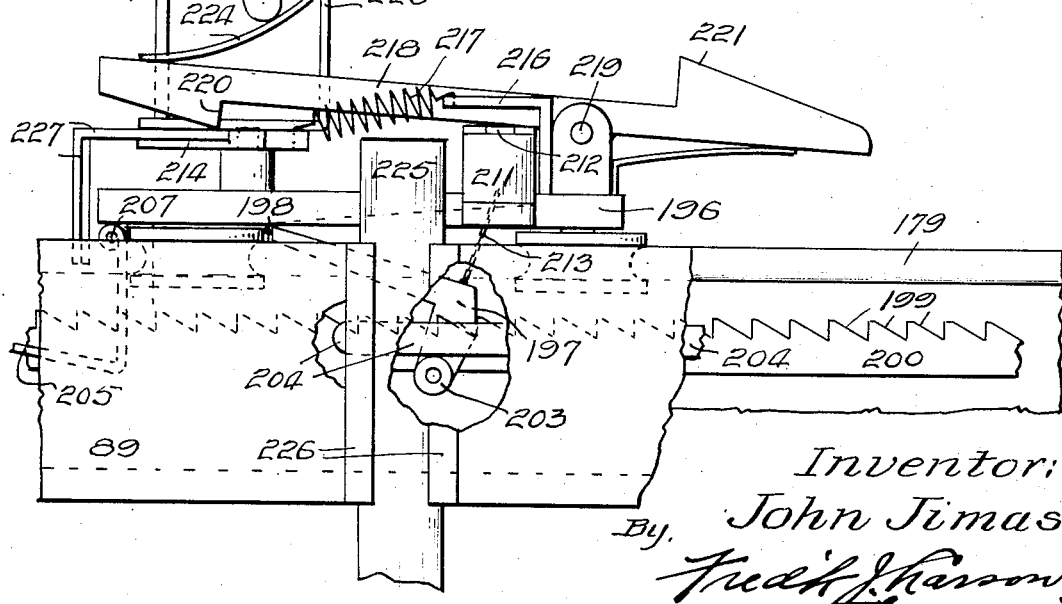

UNITED STATES PATENT OFFICE.

JOHN JIMAS, OF ALTON, ILLINOIS.

BOTTLE-CONVEYING MACHINE.

1,399,260. Specification of Letters Patent. Patented Dec. 6, 1921.

Application filed July 16, 1919. Serial No. 311,223.

*To all whom it may concern:*

Be it known that I, JOHN JIMAS, a subject of the King of Greece, residing at Alton, in the county of Madison and State of Illinois, have invented a certain new and useful Improvement in Bottle-Conveying Machines, of which the following is a specification.

My invention relates to bottle conveying machines and has for its object to provide a machine to automatically convey, or transfer newly formed bottles, released from a molding machine, to the leer, or annealing leer, thus obviating the necessity of help to carry the bottles from the molding machine to the leer, as is now the common practice.

A further object of the invention is to provide a machine, so constructed that the newly formed bottles released from the molder will be first elevated and deposited upon one end of a platform, moved in groups to the opposite end of the platform and deposited upon an elevator by means of which they are lowered to the entrance of the leer, automatically transferred from the elevator to the leer and finally moved to a predetermined position in the leer.

With the above and other objects in view, which will appear hereinafter, the invention consists in the novel construction, arrangement and combination of parts described in the following specification and finally pointed out in the claims hereto appended.

Referring to the accompanying drawings forming a part of this specification wherein like characters of reference denote similar parts throughout the several views:

Figure 1, is a top plan view of my improved bottle conveyer and shows a group of bottles about to be transferred from the elevated platform to an elevator.

Fig. 2, is a detail, showing the stop carriage at one end of the track for supporting same.

Fig. 3, is a side elevation of the machine with the elevator in its uppermost position looking in direction of the arrow designated 3 in Fig. 1.

Fig. 4, is a side elevation of the machine with the elevator in its uppermost position looking in direction of the arrow designated 4, in Fig. 1.

Fig. 5, is a front elevation of the machine looking in direction of the arrow designated 5, in Fig. 1.

Fig. 6, is a sectional elevation of the machine, taken on line 6—6 of Fig. 1, looking in direction of the arrow.

Fig. 8, is a detail, in elevation, of the means for actuating the upright bottle conveyer, the means for placing the bottles upon the upright conveyer and the means for actuating the plunger which deposits the bottles upon the receiving platform after they have been elevated.

Fig. 9, is a detail of the trigger mechanism for actuating the upright conveyer.

Fig. 10, is a view similar to Fig. 8, showing the means for actuating the upright conveyer, in its lowermost position.

Fig. 11, is a view similar to Figs. 8 and 9, showing the plunger for actuating the upright conveyer returning to its uppermost position and the plunger for actuating the bottle depositors.

Fig. 12, is a plan view of the track for supporting the carriages employed to move the bottles to their proper position in the leer and showing one of the carriages employed mounted thereon.

Fig. 13, is a sectional elevation thereof, on line 13—13 of Fig. 12.

Fig. 14, is a sectional elevation of the carriage supporting track, looking in a direction opposite to arrows 13 in Fig. 12.

Fig. 15, is a detail, in side elevation, of the three carriages and supporting track, showing their positions, prior to releasing a row of bottles in the leer.

Fig. 16, is a top plan view thereof.

Fig. 17, is a top plan view of the means for moving the bottles to their proper position in the leer.

Fig. 20, is a detail, in side elevation, of the mechanism for receiving the bottles from the molder and depositing them, one at a time, upon the upright conveyer.

Fig. 21, is a top plan of the gage carriage at the end of the track where it is reset.

Fig. 22, is a side elevation of the gage carriage, about ready to close a switch to move all the bottles in the leer to an advanced position.

Figure 7:
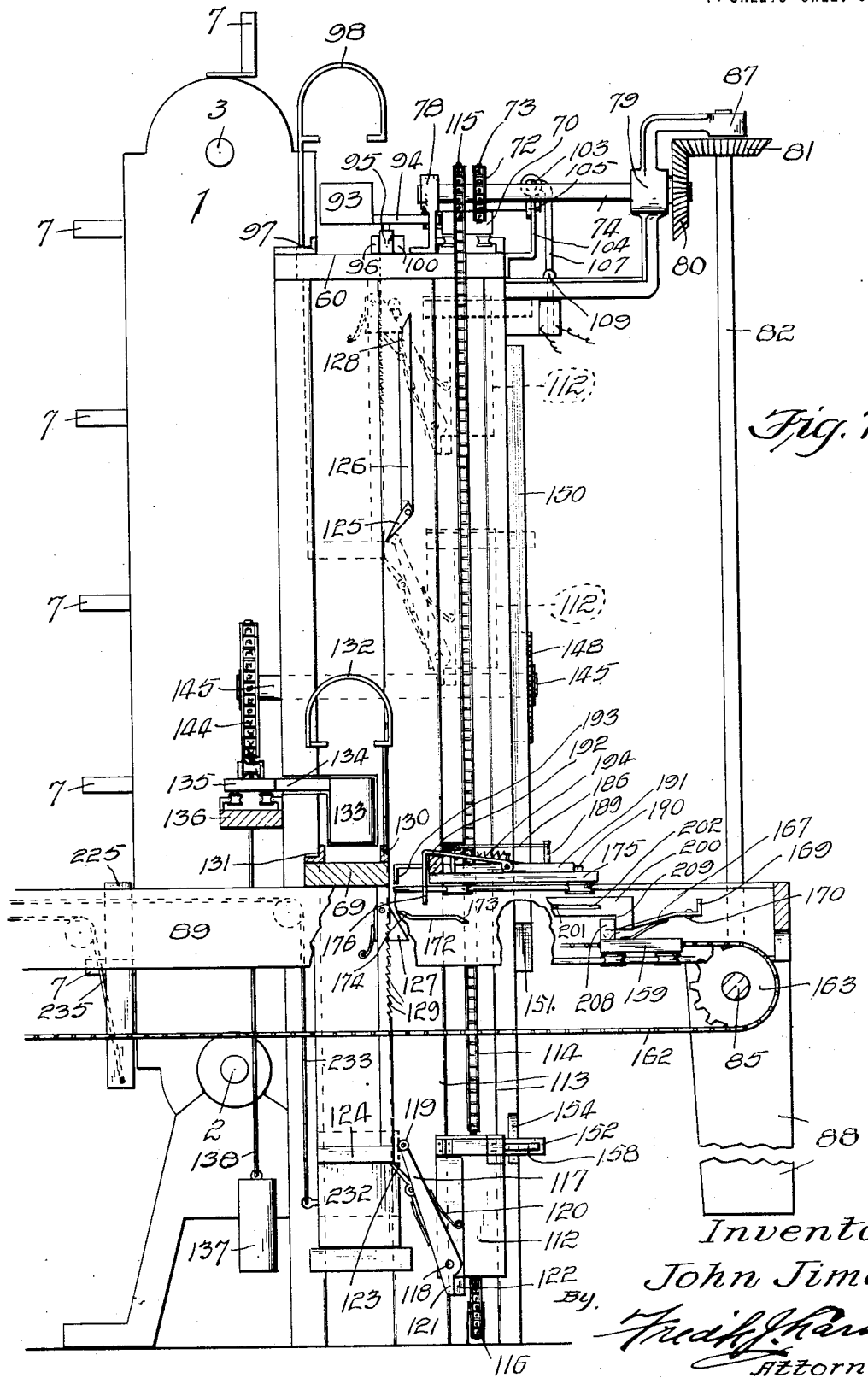
Fig. 7, is an elevation of the machine looking in the direction of the arrow designated 7, in Fig. 1 showing the elevator in its lowermost position.

The invention consists, essentially, of mechanism for receiving and delivering bottles from a molder to a vertical conveyer, mechanism for transferring the bottles to an elevated receiving platform, mechanism for transferring the bottles, preferably in groups, to an elevator, mechanism for moving the elevator up and down, mechanism for transferring the bottles from the elevator to a leer, and mechanism for moving the bottles in the leer to predetermined positions.

Referring to the drawings, the reference character 1 designates a suitable housing. 2 and 3 designate shafts rotatably mounted at the lower and upper ends of the housing 1. Suitable wheels 4 and 5 are fixed to shafts 2 and 3, respectively, over which a suitable conveyer belt 6, or its equivalent travels. The conveyer belt 6 is provided with a plurality of equally and suitably spaced steps, or bottle supporting plates 7.

The means for actuating the vertically disposed conveyer for moving the bottle supporting steps 7 from one position to another, consists of a plunger-member 8 slidably mounted in the way 9 of the housing 1. The upper end of the plunger 8 is provided with a suitable dog 9′, hingedly connected thereto, as at 10, and forced outwardly at its lower end by means of a spring 11 so that it will engage the top face of a bottle supporting step 7, as shown in Fig. 9, for moving the steps 7 from one position to another. The dog 9 works in a slot 12 in the housing 1, as clearly shown in Fig. 9. The plunger 8 is actuated by means of a suitable cable 13, or its equivalent, connected at one end to the lower end of the plunger 8 and at its opposite end to a crank shaft 14 supported in suitable bearings 15. The cable 13 rides over a suitable pulley 16. When the crank-shaft 14 is turned by means of suitable source of power, it is evident that the plunger 8 will be pulled downwardly and when it reaches the lowermost position, as shown in Fig. 10, the coiled spring 17 will return the plunger 8 to its uppermost position, as will be clearly understood from Figs. 8, 10 and 11. The lower end of the coiled spring 17 is connected to the member 18 which is fixed to the plunger 8 and extends laterally therefrom, and the opposite end thereof is fixed to the housing 1. Stops 19 and 20 are engaged by the member 18 to limit the movements of the plunger 8.

The downward movement of the plunger 8 merely moves the bottle supporting steps a distance equal to the distance between the steps, as is manifest, and when the plunger 8 has reached its lowermost position, the laterally extending member 18 thereof will engage a spring held dog 21 hingedly connected to the trigger-bar 22, as shown in Fig. 10, which bar is slidably mounted in the way 23 of the housing 1. The upward movement of the plunger 8 and member 18, will raise the trigger-bar 22 from the position shown in Figs. 9 and 10, to the position shown in Fig. 11. As the trigger-bar 22 reaches this position, the spring held dog 21 is depressed by the fixed overlying member 24, thereby disengaging itself from contact with the member 18 and permitting the trigger-bar 22 to quickly return to its lowermost or normal position. The means for causing the trigger-bar 22 to return quickly consists of a vertically disposed shaft 25 mounted in the bearings 26 and provided with an arm 27 to which one end of a coiled spring 28 is connected. The opposite end of the spring 28 is connected to the housing 1. The lower end of the shaft 25 is provided with a suitable drum 29. A suitable cable 30 is connected at one end to the drum, then wound about the drum 29 and connected at its opposite end to an ear 31 fixed to the lower end of the trigger-bar 22. The cable 30 rides over a pulley 32, as clearly shown in Figs. 8, 10 and 11. The mechanism herein described is preferably concealed behind a suitable cover-plate 33, as shown in Figs, 1, 3, 4 and 19.

The mechanism for receiving the bottles from the bottle molder A, and depositing same upon the bottle supporting steps 7 of the vertical conveyer, will now be described.

Figure 19:
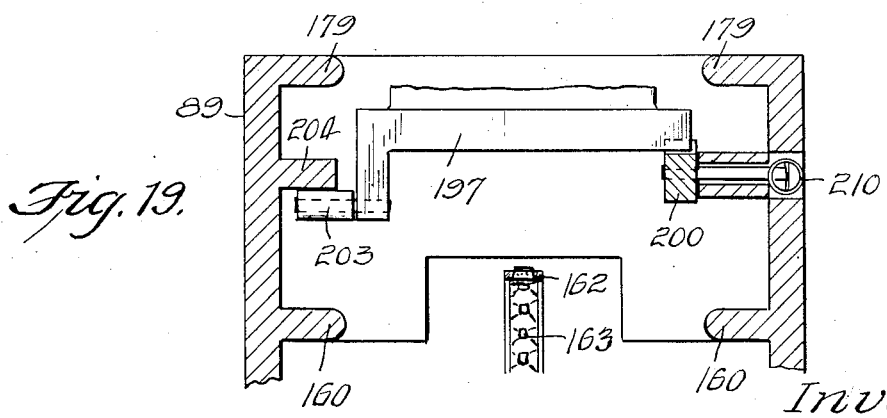
Fig. 19, is a detail in sectional end elevation of the track-table.

34 represents a bottle receiver which is positioned below the molder A. The receiver 34 is pivotally supported, as at 35, to the upper end of a supporting shaft 36 which is movably supported by means of the bearings 37 and 38, as shown in Fig. 19. The bottle receiver 34 has a closed end 39 and normally stands in the position shown in full lines in Fig. 19, to receive the bottle from the molder A with the neck end of the bottle toward the closed end 39 of the receiver 34. A stop 40 supports the receiver 34 in its inclined position.

The bottles are transferred from the receiver 34 to an inclined receiver 41 which in turn deposits the bottles upon the bottle supporting steps 7 of the vertical conveyer as they come to a position opposite the bottle supporting platform 42 supported by an arm 43 connected to the bearing 37, as shown in Fig. 19. The bottle receiver 41 is supported in its inclined position by means of the arm 44 and is connected to an arm 45 which is bent to provide the supporting shaft 46 mounted in the bearings 47. The shaft 46 is provided with an arm 48 which is connected by means of a cable 49 to the ear 31 of the trigger-bar 22, as shown in Figs. 8, 10 and 11, so that the upward movement of the trigger-bar 22 will actuate the inclined bottle receiver 41 to deposit the bottle upon the bottle receiving steps 7 of the vertical conveyer. The bottle receiver 41 moves from the position shown in full lines in Fig. 19 to the position shown in dotted lines, each time the trigger-bar 22 moves upwardly and returns to its inclined position quickly when the trigger-bar 22 returns to its lowermost or normal position.

After a bottle has been deposited in the receiver 34, which deposit takes place as the plunger 8 reaches its lowermost position, the cable 50, which is connected at one end to the lower end of the plunger 8 and at its opposite end to the drum 51 fixed to shaft 36, will, when the plunger 8 returns to its uppermost position, turn the bottle receiver 34 to the position shown in dotted lines in Fig. 19 and when the plunger 8 again returns to its lowermost position, the lower end 52 thereof will strike the end 53 of the pivotally supported kick-arm 54 and cause end 55 thereof to tilt the kick-arm 54 into the position shown in dotted lines in Fig. 19, thereby raising the closed end of the receiver 34 causing the bottle therein to be transferred to receiver 41 and platform 42 from where it is transferred to a conveyer step 7 with the upward movement of the trigger-bar 22. Immediately after the bottle has left the receiver 34, the coiled-spring 56 and cable 57 will return the bottle receiver 34 to its normal position to receive another bottle from the molder A. The kick-arm 54 is supported at the upper end of arm 58 and normally held in a horizontal position by a suitable spring 59.

The bottles elevated by the bottle supporting steps 7, of the conveyer, are deposited upon a suitable elevated platform 60 when they reach a certain elevation.

The means for transferring the bottles from their respective supporting steps 7, consists of a suitable plunger head 61 fixed to a sliding member 62 working between the guides 63. Arm 64 extends downwardly from the sliding member 62 and is connected to one end of a cable 65, which cable is connected at its opposite end to a suitable drum 66 fixed to the vertical shaft 25, as clearly shown in Figs. 8, 10 and 11. This arrangement of parts permits a bottle to be transferred, by means of the plunger 61, from the most elevated conveyer step 7, each time a bottle is placed upon a conveyer step 7 opposite the platform 42 by means of the bottle receiver loader 41. A coiled-spring 67, fixed at one end to the arm 68 and at its opposite end to the plunger-head 61, assists in returning the plunger 61 to its normal position after having transferred a bottle from a conveyer step 7 to the platform 60. It will be observed that simultaneously with the upward movement of the trigger-bar 22, a bottle is deposited upon the elevated platform 60 and another bottle is deposited upon a conveyer step to be elevated. It will be here understood that the bottles transferred to the elevated platform 60 are permitted to accumulate until a certain number has been reached and then they are moved in a group to the opposite or delivery end of the platform 60 and transferred to a suitable elevator 69.

The mechanism for moving the bottles, in groups, from the bottle receiving end of the elevated platform 60 to the delivery end thereof and transferring them to the elevator 69, will be described, and comprises, as shown in Fig. 1, a suitable traveling carriage 70 supported upon a suitable track 71 arranged upon the elevated platform. A suitable chain 72 is connected at one end to one end of the traveling carriage 70 and passes over a suitable sprocket wheel 73 fixed to a shaft 74. The chain further passes over a suitable sprocket wheel 75, mounted on a shaft 76 supported by bearings 77, and is connected at its opposite end to the opposite end of the traveling carriage 70. The shaft 74 is mounted in the bearings 78 and 79. A suitable gear 80 is fixed to shaft 74 and meshes with a suitable gear 81 fixed to the upper end of a vertically disposed shaft 82. The lower end of shaft 82 is provided with a suitable gear 83 which meshes with a suitable gear 84 fixed to the horizontally disposed shaft 85. Shaft 82 is mounted in the bearings 86 and 87, while shaft 85 is supported by the legs 88 of the track-table 89. Shaft 85 is driven by such source of power as a suitable reversible electric motor 90.

The traveling carriage 70 is provided with an arm 91 pivotally supported, as at 92. A suitable head 93 is fixed to one end of the arm 91 and is held against the action of a suitable spring 94. The arm 91 is provided with a roller 95 which engages and rolls the guide bar 96 to hold the head 93 in proper position to engage the rear bottle of a group of bottles while moving them from the receiving end of the elevated platform 60 to the delivery end thereof and transferring them to the elevator 69, as shown in Figs. 1, 3 and 4. The bottles move upon the elevated platform 60 between the guide 96 and a suitable guide-bar 97, as shown in Fig. 1. A further guiding means 98 is employed to prevent the bottles from falling over sidewise. A short guide-bar 99 is arranged between the track 71 and the guide-bar 96 at the receiving end of the elevated platform and one end of the guide-bar 99 is provided with a pivotally held dog 100. The free end of the dog engages the guide-bar 96 and is normally held thereagainst by means of the spring 101. It will be understood that the roller 95 will engage the dog 100 when the carriage 70 and head 93 are returning to the receiving end of the elevated platform 60 thereby forcing the head 93 to move laterally and cause it to move closer to the carriage 70 to avoid engaging any of the bottles which have been deposited upon the receiving end of the platform while the carriage 70 was moving a group of bottles to the delivery end of the platform and transferring them to the elevator 69. When the carriage 70 has reached a position in its return travel that the roller 93 leaves, end 102 of the guide-bar 99, the spring 94 will force the head 93 to position in the rear of the newly deposited group of bottles and in the forward movement of the carriage 70, the head 93 will engage the rear bottle and push the group forward and upon the elevator 69.

The means for changing the direction of travel of the carriage 70, as shown in Fig. 4, comprises a rod 103 slidably mounted in the bearings 104 and having the arms 105 and 106. The rod 103 is further provided with a switch actuating arm 107 having the cross-head 108 connected at one end to switch lever 109 and its opposite end to switch lever 110. When the carriage 70 arrives at the bottle receiving end of the platform 60 the arm 111 of the carriage 70 will strike arm 106, thereby moving rod 103 and causing the cross-head 108 to close switch 110 thereby reversing the motor 90 and causing the carriage 70 to travel toward the bottle delivery end of the elevated platform 60 and when the carriage 70 arrives at a position at the bottle delivery end of the platform where the bottles have been transferred to the elevator 69, the arm 111 of the carriage 70 will strike the arm 105 thereby moving rod 103 and causing the head 108 to close the switch 109 and open switch 110 thereby reversing the motor 90 and causing the carriage 70 to travel toward the bottle receiving end of the elevated platform 60.

The mechanism for raising and lowering the elevator 69 will now be described and comprises, as shown in Fig. 7, a traveling carriage 112 mounted upon the vertically disposed track 113. A chain 114 is connected at one end to the upper end of the carriage 112, passes over a sprocket 115 fixed to shaft 74, then passes over a sprocket 116 and finally is connected at its opposite end to the lower end of the carriage 112. An arm 117 is pivotally connected at its lower end, as at 118, to an offset portion of the carriage 112. The upper end of the arm 117 is provided with a roller 119. A spring 120 holds the arm 117 in the position shown in full lines in Fig. 7, with the lip 121 against the stop 122. A spring held dog 123 is pivotally supported by the arm 112 and when the carriage 112 arrives at its lowermost position, as shown in full lines in Fig. 7, it engages the lower face of the arm 124 of the elevator 69 and raises the elevator when the carriage 112 travels upwardly when carriage 70 travels toward the bottle receiving end of the elevated platform 60.

When the carriage 112, in traveling upwardly, comes to a position where the roller comes into contact with the spring held switch dog 125 at the lower end of the guide-bar 126, the elevator 69 will have assumed its uppermost position, the spring held dog 127 will rest upon the shoulder 128 of the guide-bar 126 and hold the elevator in its uppermost position until released. After the elevator 69 has reached its uppermost position, the carriage 112 continues to travel upwardly. The roller 119 follows the right-hand face of the guide-bar 126, thus disengaging the dog 123 with the lower face of arm 124 of the elevator 69. When the carriage 112 has reached its uppermost position, as shown in dotted lines in Fig. 7, the spring 120 will force arm 117 outwardly causing the dog 123 to engage the ratchet teeth 129. As the carriage 112 starts to descend, the roller 119 will engage the inclined surface of the dog 127 forcing it from contact with the shoulder 128 thereby permitting the elevator to descend at the same rate of speed that the carriage 112 travels. When the elevator 69 comes into contact with the top of track-table 89 the dog 123 will slip over the ratchet teeth 129 as the carriage 112 and arm 117 continue to descend and when the carriage has reached its lowermost limit, the dog 123 will again engage the lower face of the arm 124 of the elevator 69 in readiness to again raise the elevator when the carriage 112 ascends.

The elevator 69 is provided with the guide-bars 130 and 131, also with the guide 132 for the neck of the bottles, to prevent their falling sidewise.

The mechanism for transferring the bottles from the elevator to the layer B, will now be described, and comprises, as shown in Figs. 3, 4, 6 and 7, a plunger head 133 having connection through the arm 134 with the carriage 135 which is movably supported upon the track 136. A suitable weight 137 is connected to one end of the carriage 135 by means of the cable 138, which cable rides over a pulley 139 supported by the track 136. A cable 140 is connected to the opposite end of the carriage 136, and rides over a suitable pulley 141 supported by the layer housing 142. The cable has connection with a chain 143 which rides over a sprocket-wheel 144 fixed to the shaft 145 and has connection at its end with a bottle guide-arm 146 pivotally supported by the layer-housing 142, as at 147, as clearly shown in Fig. 4. The shaft 145 is supported by the bearings 146 which are fixed to the standard 147.

A gear 148 fixed to the shaft 145 on the end opposite the sprocket 144 meshes with the teeth 149 of a suitable rack 150. The rack 150 is slidably mounted upon one edge of the standard 147. The lower end of the rack 150 is provided with a shoulder 151. A laterally swinging arm 152 which is hingedly connected to the upper end of the carriage 112, as shown in Figs. 4 and 7, is adapted to engage the shoulder 151 prior to the elevator 69 coming into contact with the table-track 89 in descending. As the carriage 112 continues to travel downwardly, the arm 152 will pull the rack 150 downwardly rotating the gear 148 which in turn will rotate the sprocket 144 thereby causing the carriage 135 and plunger head 133 to move forward. The forward movement of the plunger head 133 will push the bottles off of the elevator 69 and deposit the bottles upon the leer belt 153 which bottles are shown in dotted lines in Fig. 1. As the carriage 112 reaches its lowermost position, as shown in Fig. 7, the hinged arm 152 of the carriage 112 will engage a cam 154 which will crowd the arm 152 out of engagement with the shoulder 151, of the rack 150 thereby releasing the rack 150 and permitting the weight 137 to bring the carriage 135 and rack 150 back to their normal positions very quickly. A coiled-spring 155 also assists in returning the carriage 135 and rack 150 to their normal positions and is fixed at one end to the standard 147 and at its opposite end to a cable 156. The cable 156 is connected to and wound around a suitable drum 157 fixed to the shaft 145, as shown in Fig. 6. A suitable spring 158 normally holds the hinged arm 152, of the carriage 112 in a position so that it will engage the shoulder 151 of the rack 150 when the carriage 112 travels downwardly, as will be understood from Figs. 4 and 7.

The means for pushing a group of bottles from the receiving end of the leer to a predetermined position therein, as shown in Figs. 1, 15 and 16, of a traveling carriage 159 supported by the rails 160 of the track table 89. A chain 162 is connected at one end to one end of the carriage 159, passes over a sprocket wheel 163 fixed to shaft 85 and then passes over a sprocket wheel 164 fixed to a shaft 165 journaled in the legs 166 of the track table 89 and finally connected to the opposite end of the carriage 159. Carriage 159 is provided with an arm 167 pivotally connected thereto, as at 168. The arm 167 is provided with a lip 169 and a laterally extending roller 170. The arm 167 is held in its uppermost position, as shown in Figs. 13 and 15, by means of the spring 171. The arm 167 is moved or forced downwardly at a certain point along its path of travel by means of a cam-member 172 having the inclined ends 173 and 174. When the carriage 159 is traveling in the direction of the arrow in Figs. 13 and 14, the roller 170 will engage the inclined end 173 of the cam-member 172 and force the roller to travel under the cam-member, thereby lowering the arm 167. When the carriage 159 travels in the opposite direction, the roller 170 which engages the inclined end 174 of the cam-member 172 causes the roller 170 to ride on the upper face of the cam-chamber, as is manifest.

The carriage 159 is adapted to pull a carriage 175 in one direction and push it in the opposite direction. When the carriage 159 is traveling to the right, as illustrated in Fig. 15, the upright lip 169, of the arm 167, will engage the rear face of the depending lip 176 of the arm 177, which is pivotally connected to the carriage 175, as at 178. The lip 176 is held in its normal position by gravity.

The carriage 175, which is mounted to travel upon the rails 179, of the track-table 89 is provided with a laterally extending arm 180, as clearly shown in Figs. 1 and 17. Arm 180 extends into the leer housing 142 and is positioned just above the bottle receiving and conveyer belt 153 and is provided with a suitable back-plate 181.

Figure 18:
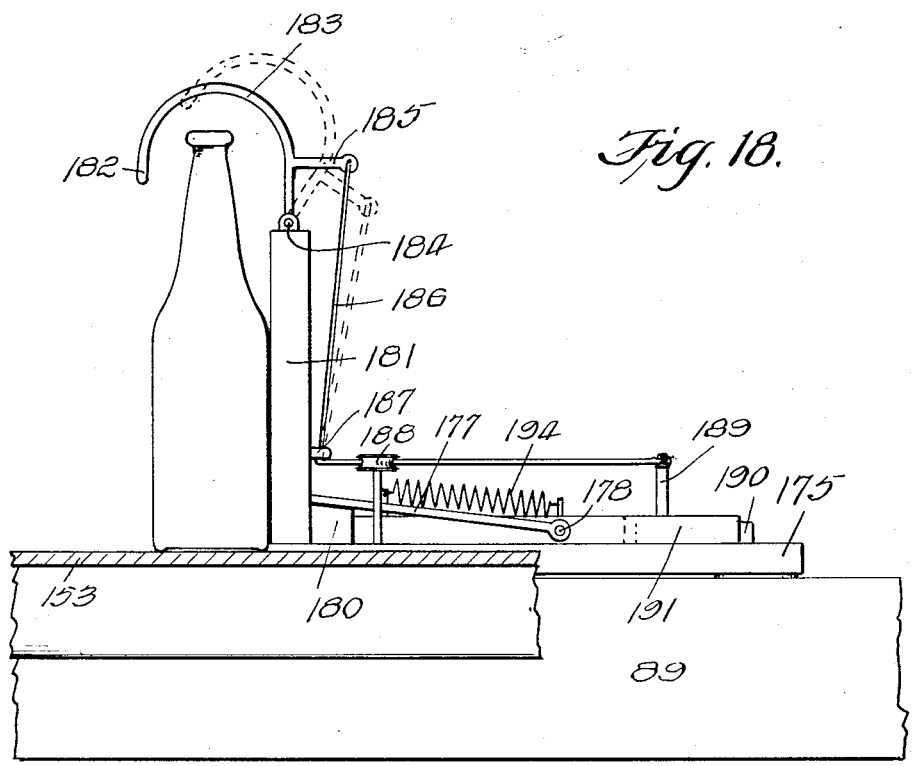
Fig. 18, is a detail, in side elevation, of the means for moving the bottles in the leer.

A suitable guide-rod 182 is provided at each end with the inverted U-shaped end arms 183. The arms 183 are pivotally connected to the back-plate 181, as at 184. One of the end arms 183 is provided with an extension 185. A cable 186 is connected at one end to the arm extension 185. The cable 186 passes downwardly through an eyelet 187, as shown in Fig. 4, then over a roller 188 supported by the carriage 175 and is finally connected to an arm 189, which arm 189 is fixed to a slidable-bar 190 carried between the guides 191 of the carriage 175, as clearly shown in Fig. 16. The sliding-bar 190 is provided at its forward end with an extension 192 having the downwardly bent forward end 193. A coiled spring 194 is connected at one end to the slidable-bar 190 and at its opposite end to a bracket 195 fixed to the guides 191. This spring 191 normally holds the extension 192 in the advanced position, as shown in Figs. 15 and 16. It also permits the bottle guide 182 to stand in the position, shown in full lines in Fig. 18.

As the carriage 159 moves forward from the position shown in Fig. 7, to the position shown in Fig. 2, it will be observed that the lip 169 will engage the lip 176 after the elevator 69 has started to raise and thereby pull the carriage 175 forward therewith. As the carriage 175 is moved forward, the back-plate 181 will engage a row of bottles at the receiving end of the leer conveyer 153 and move them along upon the conveyer 153 to a point where they are to be deposited, as shown in full lines in Fig. 1.

The position upon the leer conveyer 153, where a row of bottles are to be deposited, is gaged by means of a stop-carriage 186, clearly shown in Figs. 1, 15 and 16.

Carriage 196 is movably supported by means of the rails 179, of the track-table 89 and is held from displacement by means of a suitable dog 197 hingedly connected at one end, as at 198. The lower, or free end of the dog 195 engages in the notches 199 of the pull-bar 200. The pull-bar 200 is mounted upon the guide pins 201 which pass through slotted openings 202 at each end of the pull-bar 200. The dog 197 is provided with a laterally extending roller 203, which roller engages the lower face of a guide-bar 204 fixed to one side of the track-table 89, when the carriage 196 travels in the direction of the elevator 69 and upon the top face of the guide-bar 204 when the carriage 196 is carried in the opposite direction, the return movement of which will be fully explained hereinafter.

When the lip 193, of the arm extension 192, of the carriage 175 strikes the end of stop-carriage 196, as shown in Figs. 15 and 16, the carriage 196 being held against backward movement by means of the dog 197 engaging in one of the notches 199 of the pull-bar 200 will permit the carriage 175 to still move forward a slight distance while the bar 190 and arm 192 remain stationary. The forward movement of the carriage 175 after lip 193 of arm 192 engages the stop carriage, will cause the guide rod 182 to be raised to a position above the top of a row of bottles, as shown in dotted lines in Fig. 18. After the guide-rod 182 has been raised the roller 170 of arm 167 of the carriage 159 engages and rolls under the inclined lip 205 of the depending member 206, hinged as at 207 to the underside of the stop carriage 196, as shown in Fig. 15. The inclined lip 205 will cause the lip 169 of arm 167 to disengage lip 176 thereby stopping the movement of carriage 175. The guide-rod 182 will remain raised while the carriage 175 is stationary. After the carriage 159 ceases to further pull the carriage 175, the carriage 159 will continue to travel to the right until the motor 90 is reversed. Upon the return travel of the carriage 159, the lip 169 of arm 167 thereof, will strike the outer face of lip 176 of arm 177 mounted on carriage 175, and will push the carriage 175 to the left to a position upon the track-table 89, as shown in Fig. 7. The carriage 175 is released when the roller 170 of arm 167 strikes the cam-member 172, as is manifest. After the carriage 159 ceases to further push the carriage 175, the carriage 159 continues to travel until the motor 90 is again reversed, when then the carriage 159 will start in the opposite direction of travel and connect with carriage 175 to bring another row of bottles, transferred from the elevator 69 to the layer, forward in the leer, to a position where they are to be deposited.

Each time that the carriage 159 returns to that end of the track-table 89 shown in Fig. 7, the stop 208 fixed to carriage 159, engages the shoulder 209 of the pull-bar 200 and pulls or moves the stop carriage 196 forward a distance equal to the diameter of a bottle so that the next row of bottles brought up for deposit in the leer by the carriage 175, will be released at the proper position therein. A suitable spring 210, as shown in Fig. 12, is connected at one end to the pull-bar 200 and at its opposite end to the track-table 89, which brings the pull-bar 200 back to its normal position after the stop carriage 196 has been advanced to its new position.

The stop carriage 196 is provided with an inclined arm 211 hinged to the carriage, as at 212, and a cable connection 213 connects the free end of the dog 197 with the arm 211, as shown in Fig. 15. A suitable arm 214 is pivotally mounted upon the stop carriage 196, as at 215. The short end of the arm 214 is connected to a bracket 216 by means of a spring 217. A suitable arm 218 is pivotally connected to one side of the carriage 196, as at 219. The forward end of the arm 218 is provided with a shoulder 220 and at its opposite end with an inclined surface 221. The arm 214 is provided with an upright stop-pin 222 and an angular member 223. The forward end of the arm 218 is provided with an inclined switch actuating spring member 224. The arm 214 lies in an inclined position, as shown in Fig. 16, when the stop-carriage travels toward the elevator 69 and the forward end of the arm 218 rests upon one end of the arm 214.

When the leer housing 142 has been filled with bottles, the stop carriage will have been advanced to a position upon the track-table 89, so that the free end of arm 211 will come directly over the vertical plunger 225 which is held in the guides 226 fixed to the table-track 89. As the stop carriage reaches this position the leaf spring 224 will engage and close an electric switch 226' supported by the track 136. At the same time, the stop-pin 222 will strike the track 136 and force the arm 214 from its inclined position to a position at right angles to the longitudinal axis of the stop carriage 169, as shown in Fig. 20. When the arm 214 is brought into this position, it is held there by the shoulder 220 engaging one edge of the arm 214, as is manifest, and will also bring an extension arm 227 integral with arm 214, to a position, as indicated in dotted lines in Fig. 16, in alinement with an advance arm 228 fixed to the forward end of the carriage 175.

Now, the next time that the carriage 175 is brought forward by carriage 159, the arm 228 thereof will engage the end of arm 227 which will permit the bottles, transferred to the leer from the elevator 69, being pushed to the far end of the leer before they are released, or deposited.

Just prior to the stop carriage 159 having reached its extreme right hand position upon the track-table 89, the inclined face 221 of the arm 218 will engage the roller 229 supported by the track-table 89. This roller will force the rear end of arm 218 downwardly thereby raising the forward end and disengaging the shoulder 220 from engagement with the arm 214 thereby allowing the spring 217 to bring the arm back to an inclined position and disengage the end of arm 228 with arm 227. After this operation, the carriage 175 will still move forward until the guide rod 182 has been raised above the bottles in which position it is held until the carriage starts to push the carriage 175 back to the position shown in Fig. 7, which is at the opposite end of the track-table 89.

When the switch 226' is closed by the spring 224, it closes an electric circuit 230 to a suitable motor 231 which moves the leer conveyer 153 in the direction of travel of the arrow shown in Fig. 4, thereby removing all accumulated bottles in the leer a suitable distance to the left to permit the next group of bottles to be deposited at the far end of the leer.

It will here be understood that when the stop-carriage 196 has reached a position adjacent the switch 226', that the lower end of the arm 124 of the elevator 69 will engage a sliding member 232, as shown in Fig. 7, when the elevator is in its lowermost position. The downward movement of this sliding member 232 will pull a cable 233 and expand a spring 234 connected to the track-table 89 and cause the plunger 224 to be lowered due to the slack produced in cable 235 which is connected at one end to the lower end of the plunger 225 and at the opposite end to the spring 234. As the elevator 69 ascends, the spring 234 will raise the plunger 224 which in turn will engage and raise the arm 211 of the stop carriage 196. The raising of arm 211 will automatically raise the dog 197 and cause the roller 203 to ride upon the upper face of the guide-bar 204 instead of in contact with the lower face thereof. By causing the roller 203 to engage the upper face of the guide-bar 204 during the return of the stop carriage 196 from its position adjacent the switch 226' to its furthermost right hand position, it holds dog 197 free from engagement with the notches 199 of the pull-bar 200. When the carriage reaches its right hand or starting position, the roller 203 is again allowed to engage the lower face of the guide-bar 204 in the return movement of the stop-carriage toward the electric switch 226'.

The operation of the device is as follows:

Newly formed bottles, when released from a molder, are transferred by the mechanism previously set forth to a vertically disposed conveyer. The conveyer elevates bottles and when they reach a point in aline with the elevated bottle receiving platform 60 they are transferred to the platform. When a number of bottles have been transferred to the platform 60, say six, as shown in the drawings, the traveling carriage 70 will cause the bottles to be moved from the receiving end of the platform 60 to and upon the elevator 69 which will arrive at its uppermost position in time to receive the bottles from the delivery end of the platform 60.

When the bottles have been transferred to the elevator 69, the motor 90 is automatically reversed and the elevator will start to descend, supported by the carriage 112. The carriage 70 will also start for the other end of the platform to bring forth another group of bottles which will have been received at the receiving end of the platform from the conveyer during the travel of the carriage 70 toward the elevator and back again.

As the loaded elevator 69 descends, the carriage 159 will be returning the carriage 175 to the position shown in Fig. 7, and the carriage 175 will arrive at this position just prior to the elevator stopping and resting upon the track-table 89, as shown in Fig. 7. When the carriage 175 has reached the position shown in Fig. 7, the carriage 159 continues to travel to the right and before it stops, it advances the notched pull-bar 200 and stops carriage 196 a distance equal to the diameter of a bottle, and when the carriage 112 reaches its lowermost position, the dog 123 thereof will engage the lower end of the arm 124 of the elevator, as shown in Fig. 7.

When the elevator 69 has reached and is resting upon the track-table 89, the arm 152 of carriage 112 will engage the shoulder 151 of the rack-bar 149 pulling the rack-bar downwardly with the movement of carriage 112 thereby causing the plunger 133 of carriage 135 to transfer the bottles from the elevator, when in its lowermost position, to the leer upon the receiving end of the leer conveyer 153. When the carriage 112 has reached its lowermost position one end of the arm 153 will be moved outwardly coming in contact with cam-member 154 which disengages the arm 152 with the shoulder 151 thereby permitting the rack-bar 149 to quickly move upwardly to its normal position and at the same time cause the carriage 135 and plunger head 133 to return to their normal positions. When the pusher 133 starts to transfer the bottles from the elevator 69 to the leer, the guide-arm 146 will be lowered to guide the bottles from the elevator to their position upon the conveyer 153.

When the carriages 159 and 112 have reached the positions shown in Fig. 7, the carriage 70 will have reached its extreme left end position on the platform 60, looking at Fig. 1, and when the carriage 70 reaches this starting point position it reverses the motor 90, causing the carriage 70 to start traveling toward the elevator 69 and cause the carriage 112 to raise the elevator 69, and further causes the carriage 159 to start toward the left, looking at Fig. 7, and to pull the carriage 175 therewith when lip 169 of carriage 159 engages lip 176 of carriage 175. As the carriage 175 moves, the arm 180 and back 181 thereof will push a group of bottles forward upon the leer conveyer 153, as is manifest.

When the carriage 175 is stopped by coming into contact with the stop carriage 196, the bottle guide-rod 182 is automatically raised free from the top of the bottles to permit the carriage 175 to be pushed back to its starting point without tipping over the bottles in the leer when the carriage 159 returns to its starting point.

From the foregoing description, it will be evident that I have provided a machine which will automatically transfer bottles from a molder to a leer, and so constructed that a passage or aisle is provided under the elevated platform between the vertical bottle conveyer and the standard 147, so that persons may walk under the machine and avoid going around the same.

The many advantages of the hereindescribed invention will readily suggest themselves to those skilled in the art to which it appertains.

I do not wish to be understood as having limited myself to the details of construction shown and described, but desire to have it understood that the machine I have shown in the drawings is merely illustrative, as it is manifest that various minor changes may be made in the exact construction and particular arrangement of parts without departing from the spirit of my invention, hence reserve the right to make any such changes or modifications as may fairly fall within the scope of the appended claims when fairly construed.

What I claim is:

1. A bottle conveying device comprising a vertically disposed intermittently movable carrier, a holder for receiving bottles, one at a time, neck first as they fall from a molding machine, means for transferring the bottles from said holder, bottom first, onto a second holder, means for actuating said second holder for depositing the bottles upon the carrier, an elevated bottle receiving platform at the upper end of said carrier and mechanism for transferring the bottles, one at a time, from the carrier to the bottle receiving platform as they reach the elevation of the platform.

2. A bottle conveying device comprising a vertically disposed intermittently movable carrier, a holder for receiving bottles, one at a time, neck first as they fall from a molding machine, means for transferring the bottles from said holder, bottom first, onto a second holder, means for actuating said second holder for depositing the bottles upon the carrier, an elevated bottle receiving platform at the upper end of said carrier, mechanism for transferring the bottles, one at a time, from the carrier to the bottle receiving platform as they each the elevation of the platform, mechanism movable upon said platform for transferring the deposited bottles in groups from the receiving end of the elevated platform to an elevator at the opposite end of the platform, mechanism for lowering the elevator and bottles thereon to a position adjacent the mouth of the leer and mechanism for transferring the bottles upon the elevator into the leer.

3. A bottle conveying device comprising a vertically disposed intermittently movable carrier, a holder for receiving bottles, one at a time, neck first as they fall from a molding machine, means for transferring the bottles from said holder, bottom first, onto a second holder, means for actuating said second holder for depositing the bottles upon the carrier, an elevated bottle receiving platform at the upper end of said carrier, mechanism for transferring the bottles, one at a time, from the carrier to the bottle receiving platform as they reach the elevation of the platform, mechanism movable upon said platform for transferring the deposited bottles in groups from the receiving end of the elevated platform to an elevator at the opposite end of the platform, mechanism for lowering the elevator and bottles thereon to a position adjacent the mouth of the leer, mechanism for transferring the bottles upon the elevator into the leer and mechanism for moving the bottles to a predetermined position within the leer after the bottles have been transferred to the leer from the elevator.

4. A bottle conveying machine comprising, in combination, a bottle receiving means, an endless vertically disposed bottle carrier arranged adjacent said bottle receiving means, mechanism for transferring the bottles from the bottle receiving means to said endless bottle carrier, one at a time, means for intermittently moving the bottle carrier for elevating the bottles, an elevated bottle receiving platform arranged at the upper end of said endless bottle carrier, mechanism for transferring the bottles from the carrier to said platform and mechanism movable upon said platform for transferring the bottles deposited upon the platform in groups to a leer 5. A bottle conveying machine comprising, in combination, a bottle receiving means, an endless vertically disposed bottle carrier arranged adjacent said bottle receiving means, mechanism for transferring the bottles from the bottle receiving means to said endless bottle carrier, one at a time, means for intermittently moving the bottle carrier for elevating the bottles, an elevated bottle receiving platform arranged at the upper end of said endless bottle carrier, mechanism for transferring the bottles from the carrier to said platform, an elevator at one end of said platform, mechanism movable upon said platform for transferring bottles, in groups, from the receiving end of said platform to and upon said elevator, mechanism for lowering the elevator to a position adjacent the receiving opening of a leer having an intermittently movable leer conveyer, mechanism for transferring the bottles from the elevator to the leer conveyer and mechanism for moving the bottles in groups transferred to the leer to a predetermined location therein.

6. A bottle conveyer for transferring bottles from a molding machine to a leer comprising an intermittently vertically movable bottle carrier, mechanism for receiving bottles, one at a time, from the molding machine and depositing them upon said carrier, an elevated bottle receiving platform extending from the upper end of said carrier, mechanism arranged adjacent the upper end of said carrier for transferring the bottles to said platform, as they arrive at the elevation of said platform, an elevator arranged at the opposite end of said platform, mechanism for transferring the bottles at the receiving end of said platform, in groups, to and upon said elevator, mechanism for lowering the elevator after it has been loaded to a position opposite the leer, mechanism for transferring the bottles from the elevator to a leer conveyer within the leer and means for moving the bottles, in groups, to a predetermined position within the leer.

7. A machine for conveying bottles from a molding machine to a leer comprising means for receiving the bottles from the molding machine as they drop therefrom, an intermittently movable vertically disposed carrier arranged adjacent said bottle receiving means, mechanism for transferring the bottles one at a time from the bottle receiving means to said carrier, an elevated bottle receiving platform extending from the upper end of said carrier, a pusher arranged adjacent the upper end of said carrier upon said elevated platform for transferring the bottles from the carrier to the platform as they reach the elevation of the platform, an elevator arranged at one end of said platform, mechanism movable upon said platform for transferring a plurality of bottles at a time from the receiving end of the platform to and upon the elevator at the discharge end of the platform, mechanism for lowering the platform when loaded with bottles, a movable leer conveyer, pusher mechanism for transferring the bottles from the elevator when in its lowermost position to and upon the leer conveyer, means for moving the bottles to a predetermined position upon the leer conveyer and means for intermittently moving the leer conveyer.

8. A machine for conveying bottles from a molding machine to a leer comprising means for receiving the bottles as they drop from the molding machine, a vertically movable endless carrier arranged adjacent said bottle receiving means, mechanism for transferring the bottles, one by one, to said carrier, means for intermittently moving the carrier for elevating the bottles deposited thereon, an elevated bottle receiving platform extending from the upper end of said carrier, mechanism movable upon said platform adjacent the upper end of said carrier for transferring the bottles from the carrier to said elevated platform as they reach the elevation of said platform, an elevator forming a continuation of the platform when the elevator is in its uppermost position, mechanism movable upon said platform for transferring the bottles in groups from the receiving end of said platform to and upon said elevator at predetermined intervals, mechanism for lowering the elevator and bottles deposited thereon to a predetermined lower elevation opposite the mouth of the leer, mechanism for transferring the bottles upon the elevator from the elevator to a leer conveyer, mechanism for moving the bottles upon the leer conveyer and mechanism for intermittently moving the leer conveyer for discharging the bottles from the leer.

In testimony whereof, I have hereunto signed my name to the specification.

JOHN JIMAS.